United States Patent [19]

Grove, Jr.

[11] Patent Number: 4,539,844

[45] Date of Patent: Sep. 10, 1985

[54] METER VAULT COVER WITH EXTERNALLY VISIBLE REGISTER

[76] Inventor: L. W. Grove, Jr., 409 Biggs Ave., Frederick, Md. 21701

[21] Appl. No.: 577,022

[22] Filed: Feb. 6, 1984

[51] Int. Cl.³ .................. G01F 15/06; G01F 15/18
[52] U.S. Cl. ...................... 73/201; 73/272 A; 73/431
[58] Field of Search ............... 73/201, 272 R, 272 A, 73/273, 274, 431; 220/18; 235/94 R; 377/21

[56] References Cited

U.S. PATENT DOCUMENTS

| | | | |
|---|---|---|---|
| 1,923,481 | 8/1933 | Ford | 220/18 |
| 2,094,711 | 10/1937 | Leininger | 235/94 R |
| 3,228,244 | 1/1966 | Weinberger et al. | 73/272 A |
| 3,972,440 | 8/1976 | Warren | 73/431 X |
| 4,106,344 | 8/1978 | Moll | 73/431 |

Primary Examiner—Charles A. Ruehl
Attorney, Agent, or Firm—Walter G. Finch

[57] ABSTRACT

An improved meter vault cover having a window-like access for externally viewing and reading the internal register of liquid or gas passing through the meter is provided. The improved meter vault cover not only provides the window-like opening but also provides a carriage-like support on the inside of the cover to hold a digital readout device to serve as the register. The digital figures of the readout device are projected and exhibited at the window-like access for making the register externally visible. The improved meter vault cover consists of a meter vault cover plate, a worm-type cover locking screw, a register support carriage with suitable screws for affixing the carriage to the cover, and a register device with suitable wiring to connect it to the meter.

6 Claims, 8 Drawing Figures

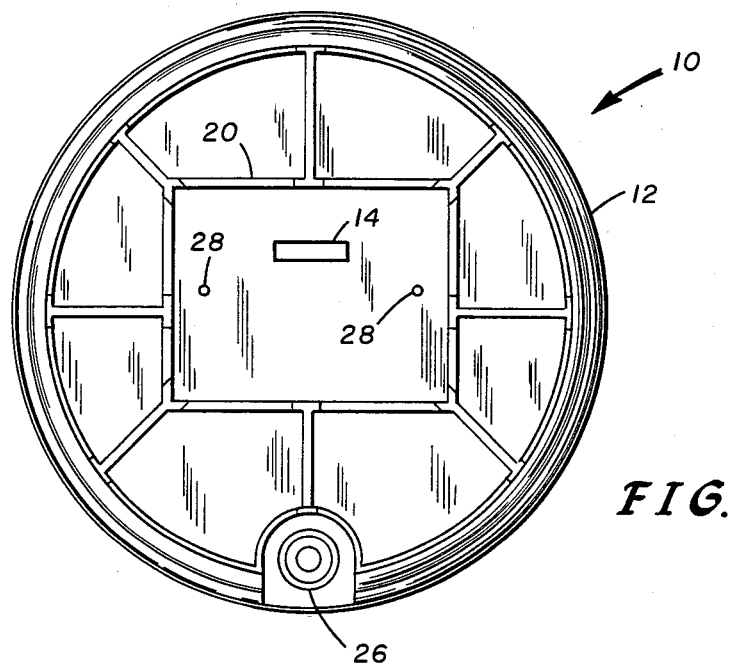
FIG. 4
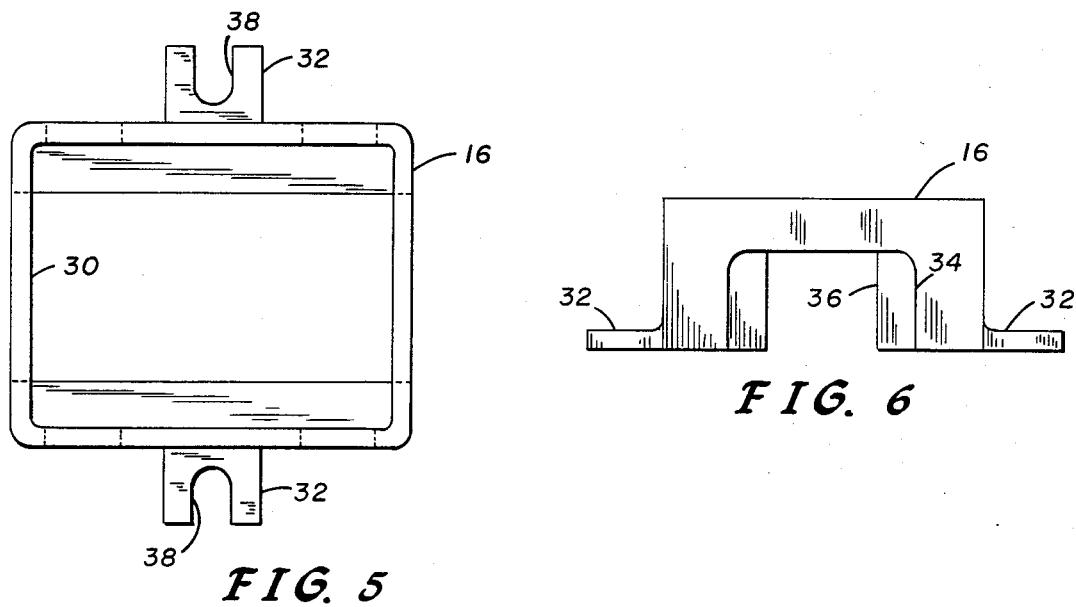
FIG. 5
FIG. 6
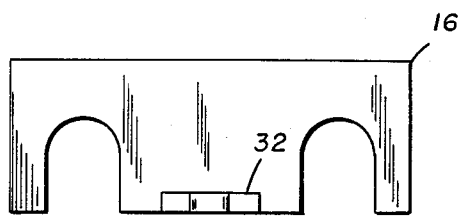
FIG. 7
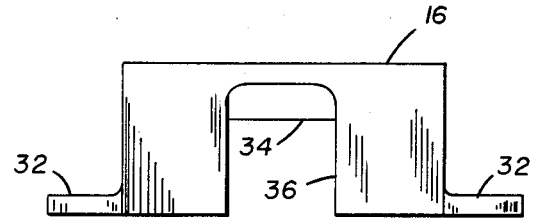
FIG. 8

METER VAULT COVER WITH EXTERNALLY VISIBLE REGISTER

BACKGROUND AND SUMMARY OF THE INVENTION

The invention relates to meters and in particular to water-type meters. Specifically, it relates to the register readout device of the meters and to the cover for the vault in which the meter is installed.

It is to be understood that although the description herein shall make reference to water-type meter devices for purposes of description, that the invention is equally applicable to meter devices and vaults in which they are installed that are for other type liquids and for gases.

At present, when an operator or an attendant or a person engaged in reading a meter or a series of meters which are installed in a ground vault, it is necessary for the reader to open the vault cover manually and peer down into the vault to read the register on the meter and then put the cover back on the vault. Often this requires kneeling or stooping to open the vault cover and very often using a flashlight to see and read the register, which is often set low enough to be below the frost level, and then returning the cover to the vault.

These meter vaults are usually found in front of or in back of houses to which the metered product is served, or similarly at industrial, commercial, or business concerns. Often in winter or inclement weather it may be necessary to dig through snow or ice to open the meter vault cover or to do the opening amid a downpour of rain. The present invention eliminates these problems, at the most it may only entail brushing aside snow or ice in order to see the register at the window-like opening in the vault cover. The vault cover never needs removal for reading the meter.

This invention is further useful for existing vaults as a replacement cover where other readout means are not available. The existing meter operates the register means in the vault cover through a two-strand wire without the need for another energy source.

The present invention consists of an improved meter vault cover plate, a worm-type cover locking screw, a register support carriage with suitable screws for affixing the carriage to the cover, and a register device with suitable wiring to connect it to the meter.

The improved meter vault cover plate has a window-like opening through which the digital type register device is visible and may be read externally. Ribs on the inside of the cover plate quickly and easily locate the register support carriage for affixing the register device in place.

It is, therefore, an object of this invention to provide an improved meter vault cover with an externally visible register.

It is another object of this invention to provide an improved meter vault cover that does not have to be removed to read the meter.

It is a further object of this invention to provide an improved meter vault cover that has a digital-type register visible at the surface of the meter vault cover.

It is also an object of this invention to provide an improved meter vault cover that can be used for liquid or gas type meters installed in vaults.

It is still another object of this invention to provide an improved meter vault cover that can be used on new installations or as a replacement on existing installations.

Further objects and advantages of the invention will become more apparent in light of the following description of the preferred embodiments.

BRIEF DESCRIPTION OF THE DRAWINGS

FIG. 4 is a bottom plan view of an improved cover for a meter vault with register carriage removed;

FIG. 5 is a plan view of a register carriage for an improved cover for a meter vault;

FIG. 6 is a left end view of FIG. 5;

FIG. 7 is a front view of FIG. 5; and

FIG. 8 is a right end view of FIG. 5.

DESCRIPTION OF THE PREFERRED EMBODIMENTS

Figure 1:
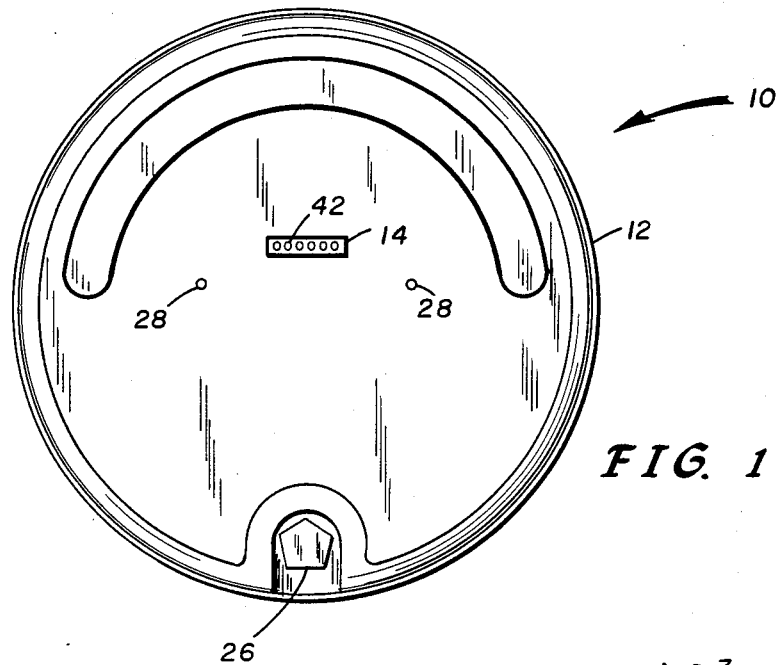
FIG. 1 is a top plan view of an assembly of an improved cover for a meter vault.
Figure 2:
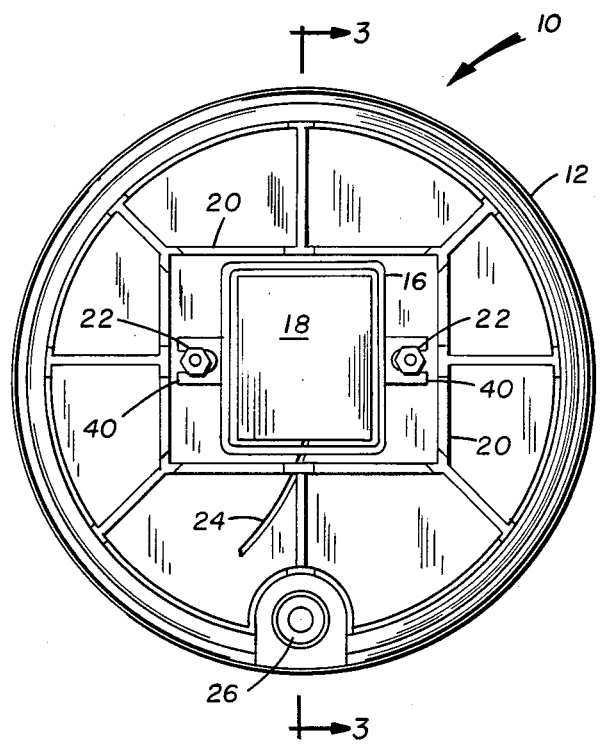
FIG. 2 is a bottom plan view of an assembly of an improved cover for a meter vault.
Figure 3:
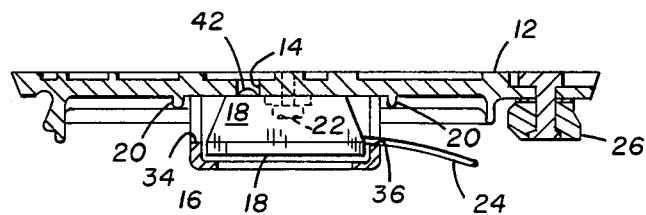
FIG. 3 is a partial cross-sectional view on line 3—3 of FIG. 2.

Referring now to the drawings, and particularly to FIGS. 1 and 2, an improved meter vault cover with an externally visible register is shown at 10. Hereinafter the improved meter vault cover with an externally visible register 10 will be referred to as the meter vault cover 10.

FIG. 1 shows a top plan view and FIG. 2 shows a bottom plan view of a meter vault cover 10. The structure of the meter vault cover 10 is arranged so that the register 18 is integral with the cover plate 12 of the meter vault cover 10 as described hereinafter.

The meter vault cover 10 consists of a cover plate 12, a carriage 16 for the register 18, two suitable screws 22 to affix the carriage 16 to the underside of the cover plate 12, and a worm-like lock 26 to lock the cover plate 12 into a vault frame (not shown).

The register 18 registers the flow of liquid or gas through the meter and provides a digital readout which can be read through a window-like opening 14 in the cover plate 12, such as the flow of water in gallons.

The register 18, such as a Carlon Meter Company register, is held in place under the cover plate 12 by the carriage 16 for the register 18. This carriage 16 makes the register 18 interface with the cover plate 12 and is so arranged so that the digital readout of the register 18 is visible externally through the window-like opening 14 in the cover plate 12. The carriage 16 is substantially rectangular in configuration and hollow. The register 18 is placed inside the hollow interior of the carriage 16 and thus holds the register 18 against the underside of the cover plate 12.

A two-strand jacketed wire 24 connects the register 18 to the meter (not shown). Suitable screws 22 removably affix the carriage 16 to the underside of the cover plate 12 so that the digital readout of the register 18 is visible through the window-like opening 14 in the cover plate 12.

By using the register 18 as noted hereinbefore, no capacitors or other electrical devices are necessary. There are no batteries or outside electrical power source needed, as noted hereinbefore. Liquid passing through the meter operates a generator which the simple two-strand jacketed wire 24 transmits the results to the register 18. There are no problems with larger remote tabulators or counters or recorders and no need to open the meter vault to read the meter, particularly in inclement weather.

When it is necessary to remove the meter vault cover 10 to get at the register 18 in the carriage 16, it is a simple matter of turning the worm-like lock 26 which lifts the cover plate 12 from the vault frame (not shown).

To simplify installation of the register 18 on the underside of the cover plate 12, the carriage 16 has been made very simple in structure and operation as described hereinafter.

To simplify locating the carriage 16 on the underside of the cover plate 12 a rib 20 on the underside of the cover plate 12 is configured in a rectangle so that the carriage 16 will only fit in a direction which permits properly locating the register 18 inside the carriage, so that the digital readout of the register 18 can be properly set to show through the window-like opening 14 in the cover plate 12.

Threaded holes 28 are positioned so as to receive screws 22 when affixing the carriage 16 to the underside of the cover plate 12 to hold the register 18 in place.

Turning now to FIGS. 5, 6, 7, and 8, the details of carriage 16 are shown in plan view, left side view, front view, and right side view, respectively.

The carriage 16 for register 18 has a partially closed face having a rectangular-like opening 30. This partially closed face provides the means for retaining the register 18 therein when the carriage 16 is affixed to the cover plate 12 with screws 22.

The carriage 16 has two outstanding yoke-like legs 32, one on the front side and one on the rear side. These yoke-like legs 32 each have a slotted opening 38 for receiving the screws 22 when affixing the carriage 16 to the cover plate 12. The slotted openings 38 permit minor adjustment in locating the screws 22 into the threaded holes 28.

The slotted openings 38 also have a secondary use. In conjunction with the clearance 40 between the ends of the yoke-like legs 32 and the inside edges of the ribs 20, the clearance 40 permits utilizing the slotted openings 38 to shift the carriage 16, carrying the register 18, so as to center the digital readout 42 of the register 18 within the window-like opening 14 in the cover plate 12 and not obscure any portion of the digital readout 42.

The carriage 16 has an opening 34 on the left side and an opening 36 on the right side, respectively. The opening 36, which in height reaches to the underside of the partially enclosed face of the carriage 16, provides a means whereby the two-strand jacketed wire 24 can be lead from the register 18 and connected to the generator means associated with the meter (not shown).

It is to be noted and understood that it is within the scope and intent of this invention, that if assembled in the reverse direction, the two-strand jacketed wire 24 could be lead from the register 18 through the opening 34 in the carriage 16 and the aforementioned connection made to the generator means associated with the meter (not shown).

As can be readily understood from the foregoing description of the invention, the present structure can be configured in different modes to provide an externally visible register in a meter vault cover.

Accordingly, modifications and variations to which the invention is susceptible may be practiced without departing from the scope and intent of the appended claims.

What is claimed is:

1. A vault cover, comprising:
 a cover plate means, said cover plate means having a locking means associated therewith;
 a window means, said window means being set into said cover plate means so as to be an aperture therethrough and made integral therewith;
 a register means, said register means having a digital readout means, said register means having a connection means, said connection means being for the purpose of connecting said register means to a source requiring registration of a quantity of flow of a substance through said source, said quantity of flow of a substance to be registered on said digital readout means;
 a carriage means, said carriage means being suitably affixed to said cover plate means, said register means being located within said carriage means, said register means being so located within said carriage means so that said digital readout means may be observed through said window means.

2. A vault cover as recited in claim 1, wherein said vault cover is for a water meter.

3. A vault cover as recited in claim 1, wherein said substance is water and said register means registers said quantity of flow in gallons.

4. A vault cover as recited in claim 1, wherein said carriage means is substantially rectangular in configuration, said carriage means being hollow on the inside to hold and retain said register means.

5. A vault cover as recited in claim 4, wherein said carriage means has a plurality of openings in the sides thereof, said plurality of openings communicating said hollow interior with the exterior thereof, said connection means of said register means passing through one of said plurality of openings for connection to said source requiring registration of a quantity of flow of a substance through said source.

6. A vault cover as recited in claim 1, wherein said substance is water and said register means registers said quantity of flow in cubic feet.

* * * * *